(12) United States Patent
Ganguly

(10) Patent No.: US 11,671,241 B2
(45) Date of Patent: Jun. 6, 2023

(54) PRIVACY-PRESERVING FAST APPROXIMATE K-MEANS CLUSTERING WITH HAMMING VECTORS

(71) Applicant: International Business Machines Corporation, Armonk, NY (US)

(72) Inventor: Debasis Ganguly, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 872 days.

(21) Appl. No.: 16/515,656

(22) Filed: Jul. 18, 2019

(65) Prior Publication Data
US 2021/0019556 A1 Jan. 21, 2021

(51) Int. Cl.
| | | |
|---|---|---|
| H04L 9/06 | (2006.01) | |
| G06F 17/16 | (2006.01) | |
| G06F 18/23213 | (2023.01) | |
| G06F 18/2413 | (2023.01) | |

(52) U.S. Cl.
CPC .......... *H04L 9/0643* (2013.01); *G06F 17/16* (2013.01); *G06F 18/23213* (2023.01); *G06F 18/24137* (2023.01)

(58) Field of Classification Search
CPC ...... G06F 17/16; G06K 9/6272; H04L 9/0643
See application file for complete search history.

(56) References Cited

U.S. PATENT DOCUMENTS

| | | |
|---|---|---|
| 6,003,029 A | 12/1999 | Agrawal et al. |
| 6,012,058 A | 1/2000 | Fayyad et al. |
| 7,590,642 B2 | 9/2009 | Campos et al. |
| 7,739,284 B2 | 6/2010 | Aggarwal et al. |
| 7,797,265 B2 | 9/2010 | Brinker et al. |
| 8,229,876 B2 | 7/2012 | Roychowdhury |

(Continued)

FOREIGN PATENT DOCUMENTS

| | | |
|---|---|---|
| CN | 106951927 | 7/2017 |
| CN | 107239791 | 10/2017 |

(Continued)

OTHER PUBLICATIONS

Li et al., Enabling Highly Efficient k-Means Computations on the SW2610 Many-Core Processor of Sunway TaihuLight. Journal of Computer Science and Technology, vol. 34, No. 1, pp. 77-93, (2019).

(Continued)

*Primary Examiner* — Qing Chen
*Assistant Examiner* — Amir Soltanzadeh
(74) *Attorney, Agent, or Firm* — Amin, Turocy & Watson, LLP

(57) ABSTRACT

This method is a process that improves the execution time and maintains very precise clustering effectiveness utilizing a unique algorithm (identified as PPK means) that optimizes a process that is referred to as K-means clustering. The PPK means algorithm utilizes estimation values of signatures of new centroids for speed improvement and encoded data to provide a level of privacy protection. A system comprises a processor, operably coupled to memory, and that executes the computer-executable components, wherein the computer-executable components comprise: an encoding component that encodes a set of real-time valued vectors as bit vectors; and a clustering component that performs K-means clustering on the bit encoded vectors.

20 Claims, 12 Drawing Sheets

(56) References Cited

U.S. PATENT DOCUMENTS

| | | | |
|---|---|---|---|
| 8,769,676 B1 * | 7/2014 | Kashyap | G06F 21/554 |
| | | | 726/22 |
| 11,295,236 B2 * | 4/2022 | Duenner | G06F 9/5027 |
| 2014/0258295 A1 | 9/2014 | Wang et al. | |
| 2015/0324441 A1 | 11/2015 | Zhou | |
| 2017/0323199 A1 * | 11/2017 | Wu | G06F 16/951 |
| 2019/0279105 A1 * | 9/2019 | Arel | G06N 3/0454 |
| 2019/0361892 A1 * | 11/2019 | Krishna | G06F 16/1865 |
| 2020/0410304 A1 * | 12/2020 | Zhou | G06N 3/0454 |

FOREIGN PATENT DOCUMENTS

| | | |
|---|---|---|
| KR | 20140064471 | 5/2014 |
| WO | 2017176145 | 10/2017 |
| WO | WO-2020013723 A1 * | 1/2020 |

\* cited by examiner

PRIVACY-PRESERVING FAST APPROXIMATE K-MEANS CLUSTERING WITH HAMMING VECTORS

TECHNICAL FIELD

The subject disclosure relates generally to system(s) and method(s) that output fast and approximate K-means clustering on large datasets by utilizing encoded bit vectors and computing approximated values of signatures of new centroids during respective iteration(s) to facilitate protecting privacy.

SUMMARY

The following presents a summary to provide a basic understanding of one or more embodiments. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products facilitate fast and approximate K-means clustering on large data sets while preserving privacy.

In accordance with an embodiment, a system comprises a processor, operably coupled to memory, that executes computer-executable components, wherein the computer-executable components comprise an encoding component that encodes a set of real-time valued vectors as bit vectors; and a clustering component that performs K-means clustering on the bit encoded vectors.

In accordance with another embodiment, a computer implemented method, comprises encoding, by a processor coupled to a memory, a set of real-time valued vectors as bit vectors; and clustering, by a processor that performs K-means clustering on the encoded bit vectors.

DETAILED DESCRIPTION

Figure 1:
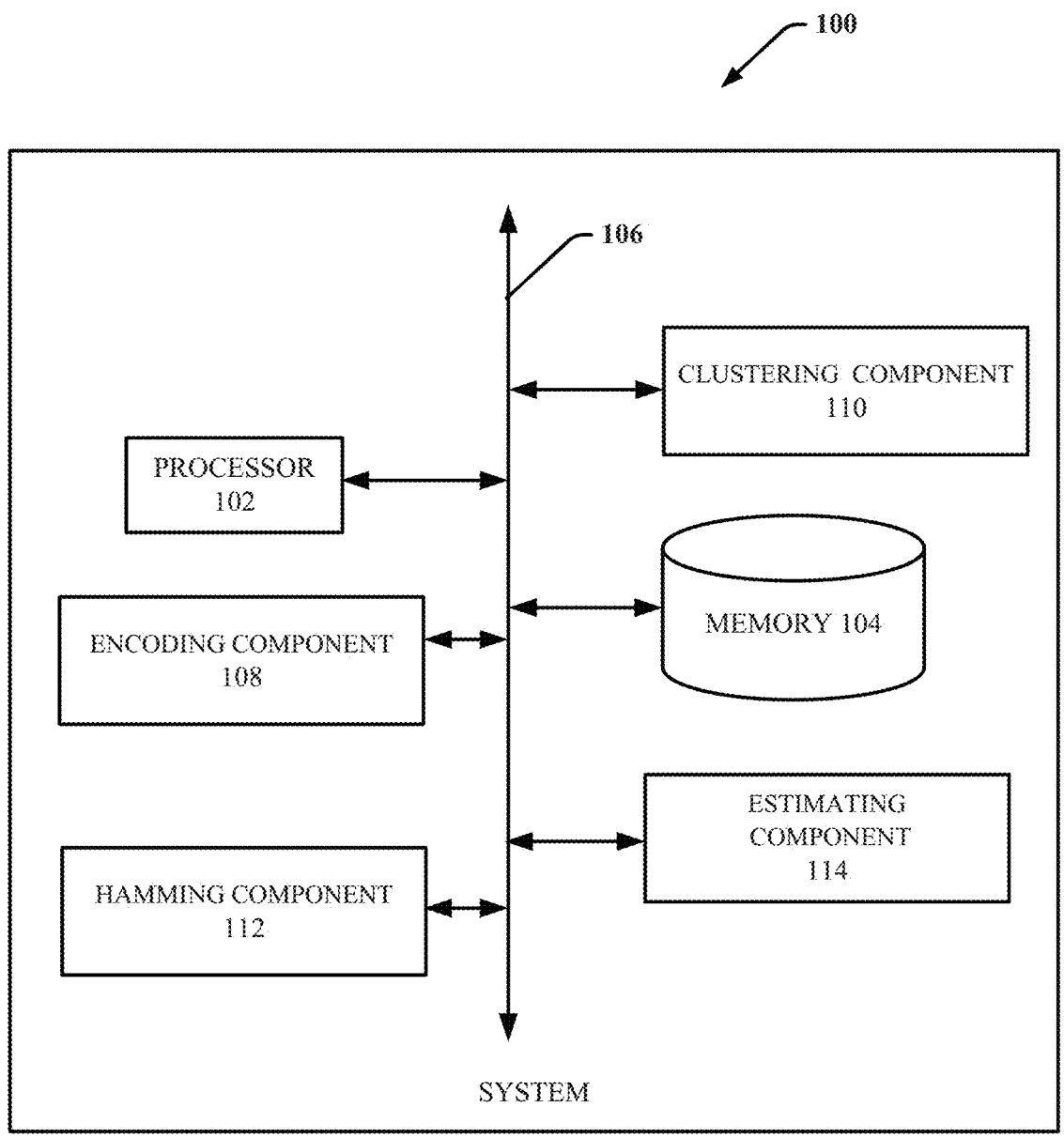
FIG. 1 illustrates a block diagram of an example system implemented that can function as an approximate PPK-Means clustering method.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In today's digital world, data plays a prime factor in many applications. Action(s) taken by a user can often leave a digital footprint through satellite images, bio-medical field, smartphones, social media and other applications. Rapidly growing technology has led to an exponential increase of machine-generated data. Big Data represents a new era in data exploration and utilization such that it consists of data that is high in volume, variety and velocity. Modern advances in software engineering have led to deploying software as services (known as SaaS), which provides an important advantage for organizations to focus on core businesses instead of expanding resources on computer infrastructure and maintenance. For example, a 'big-data' clustering software as a service, which takes a set of data instances as input, performs computations for data clustering and returns a partitioning of the data to a client as an output. Big data can be used in many scenarios for data mining such as, to track user generated content in social media, analyze web page images from the web and census data, obtain required data from Internet of Things (IoT) sensors, activity tracking from smartphones and network traffic data for cyber-security. One such technique known as Vector Quantization assists to manage data and provide data mining results for statistical analysis.

Vector Quantization is a system that maps a sequence of continuous or discrete vectors (known as data sets) into digital sequence so that it is suitable for communication. Vector Quantization is mainly used for data compression wherein bit rates are reduced to minimize communication channel capacity or digital storage memory requirements while maintaining data integrity. Some common examples of Vector Quantization include medical/satellite image storage and transmission of audio signals through old noisy radio mobile communication channels. Vector Quantization helps to segregate large set of data sets into groups that have similar set of data points. Respective groups would be segregated by its common point based on various machine learning algorithms categorized into supervised and unsupervised algorithms. Many machines use supervised learning algorithms that process input and output values and use such algorithms to map input and output values accordingly. Unsupervised algorithms have a set of input values and no corresponding output values. An objective of unsupervised learning is to understand the algorithm and ultimately compute a structure to data. One such algorithm classified as unsupervised is identified as Clustering.

Clustering is a process of classifying data samples based on observations or patterns and distinguishing data points (also known as vectors) into disjoint groups (known as clusters). Each group contains objects with similar profiles and attributes. The data classification requires a machine learning algorithm to measure distance or similarity between data sets. These algorithms are widely used across retail, banking, manufacturing, healthcare and other industries to help organize unstructured data. Many businesses use this algorithm to segregate customers data based on similar characteristics of the data. One of such industry is healthcare, where a hospital might cluster patients based on tumor size, for example, such that patients with different tumor sizes can be treated differently. Some common uses of clustering are to cluster customers based on purchase history, cluster documents based on similar words or cluster DNA sequences based on edit distance. Machine learning algorithms use various types of clustering techniques to differentiate similarity or dissimilarity of data sets.

Clustering algorithms are widely used in data mining and machine learning applications to analyze data in an organized manner and structure them according to their data patterns. There are many types of clustering algorithms such as for example K means, fuzzy c-means, hierarchical clustering and many more. These clustering techniques use distance measures to group data to corresponding families Clustering is a very useful tool for big data management and helps discover patterns within data in an unsupervised manner Among many clustering algorithms, K-means is widely utilized in the market.

As big data becomes more advent in data analytics, demand for data sampling and data dimension features is rapidly growing. Moreover, fast and efficient clustering of unlabeled samples is highly desirable. Thus, as a fundamental primitive, standard K-means clustering algorithm is receiving ever-increasing attention; this algorithm stores centroids used to define each individual cluster. A centroid is an average across data points in a cluster of data or can also be considered as an average of coordinates of vertices. For example, there may be many points distributed along a graph, with certain areas that have higher density of points than others. A point is considered to be in a cluster if it is closer to that cluster's centroid than any other centroid along an axis. A feature of standard K-means algorithm is to classify a given set of data points into k number of disjoint clusters, in which the value of k is identified first. The K-means algorithm generally finds best centroids by alternating between assigning data points to a cluster based on current centroids or choosing centroids based on current data points of the cluster. The algorithm is executed in two phases: the first phase is to define k centroids for each cluster and the next phase is to associate each data point to its corresponding nearest centroid. Standard K-means clustering is depicted by:

O(NKD) operation, where N: number of data instance, K: number of desired clusters, D: dimension of each data vector. The standard K-means algorithm operation starts with a set of N data points in D dimensions. K-means is used to segregate these points into K groups such that the data is grouped closest to the centroid. When K centroids is selected among N points at random, then for each point X among the remaining N-K ones, assign X to its nearest cluster center out of the K centroids. Then recompute its centroid for each partition (cluster) and thus repeat the steps until convergence of data points. Even though this method is widely used in many applications, the limitation of the standard K-means operation is that performance of this algorithm is slow for big data when N is over millions and D is over hundreds/thousands.

Hence embodiments herein present capabilities of a novel optimized K-means type algorithm that offers a fast-approximate K-means clustering algorithm on bit-encoded data vectors and also preserves privacy by only processing encoded data such that real data is not accessed and ultimately works under untrusted settings. This analogy is particularly useful to cluster data when clients do not trust a server. These embodiments also enhance memory utilization as each real-valued vector stores values with only small amount of memory (e.g., 8 bytes, or M bytes where M is an integer less than 100) which ultimately would consume for example 1G memory for 1 billion vectors. Moreover, these embodiments work with significant efficiency (e.g., are faster) relative to conventional algorithms even on large collections of real-valued vectors in large dimension space.

FIG. 1 illustrates a block diagram of an example system 100 that can access data and process that data using variable computing components depicted in accordance with one or more embodiments described herein. The system 100 can facilitate a process of assessing and identifying a substantial amount of various forms of data, and using machine learning, training a neural network or other type of model. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, an encoding component 108 that encodes a set of real-time valued vectors as bit vectors; and a clustering component 110 that performs K-means clustering on encoded bit vectors to produce final K clusters as output. Binary coded data vectors are fundamental to privacy preserving and the encoding component 108 can transform input data to facilitate such end. A Hamming component 112 in conjunction with an estimating component 114 can execute many interrelated functions within a PPK means algorithm that involve for example converting Euclidean data to Hamming space data, multiple iterations of estimating signatures and using a Gaussian method to produce accurate results. The clustering component 110 can utilize partitioning to segregate and produce final K clusters as an output and into meaningful data. The components (encoding component 108, Hamming component 112, estimating component 114 and clustering component 110) functionality are explained in respective paragraphs to follow. It is significant to note that the components can work in a symbiotic manner so each process is not isolated to a specific component.

The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any suitable device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, the encoding component 108 can provide a layer of virus or malware protection as embodiments can encode data in a format that can prevent or mitigate data infiltration by malware. Regardless of the encoding (transformation), embodiments can generate results that can reflect very closely that output obtained on processing the non-encoded data is not significantly different than that obtained after encoding data. The clustering component 110 can also take advantage of using Hamming distance and its ability to execute more efficiently XOR and BITCOUNT machine instructions on memory and variables to produce overall faster process execution time as compared to the state of the art.

The various components of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity.

The subject computer processing systems, methods apparatuses and/or computer program products can be employed to solve new problems that arise through advancements in technology, computer networks, the Internet and the like.

Figure 2:
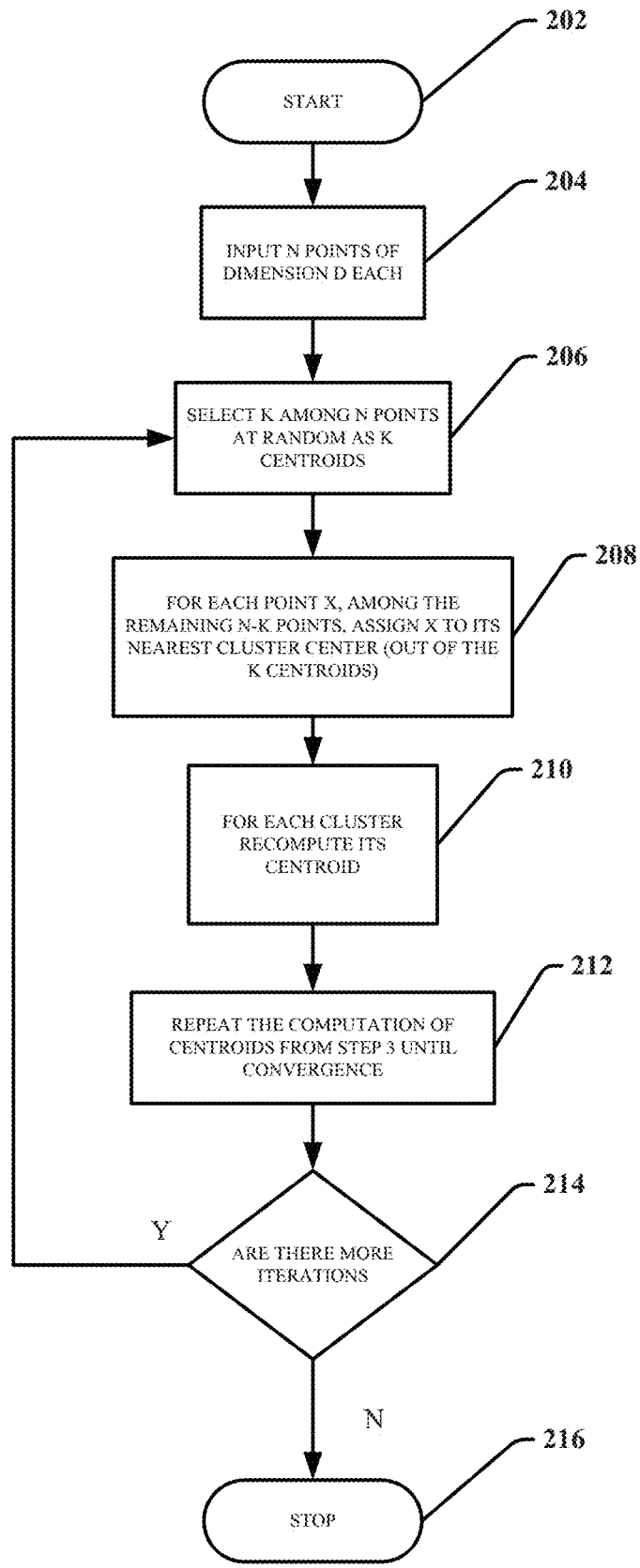
FIG. 2 illustrates a flow chart of a standard K-means execution process.

FIG. 2 illustrates a flow chart of a standard K-means execution process. It is significant to understand this basic algorithm in reference to optimization and privacy preserving novelty that the PPK means algorithm provides. A first step of the standard K means process is to input the number of data points identified as N collected for the entire sample labelled at block 204. As the points are in D dimensional space, select K centroids as labelled at block 206 which ultimately groups data points based on tumor sizes as an example. For each point out of the K centroids, assign them to a nearest cluster at block 208 and for each cluster that is identified in block 208, recompute centroids within that cluster as labelled at block 210. This process is repeated from block 206 until convergence of data points are encompassed into respective corresponding clustered centroid. In general, the number of iterations vary (e.g., can range between 50-100 iterations). Upon execution of these iterations, if a limit is not reached, then the process is repeated from block 206 which is then followed by blocks 208, 210 and 212. If there are no more iterations to be executed at block 214, then the algorithm is completed, and the data points are clustered in their corresponding families along with their respective centroids within each cluster. This method is widely used in many applications, however, a limitation of the standard K-means operation in performance of this algorithm is slow for large sets of data and can impact resource consumption heavily.

Figure 3:
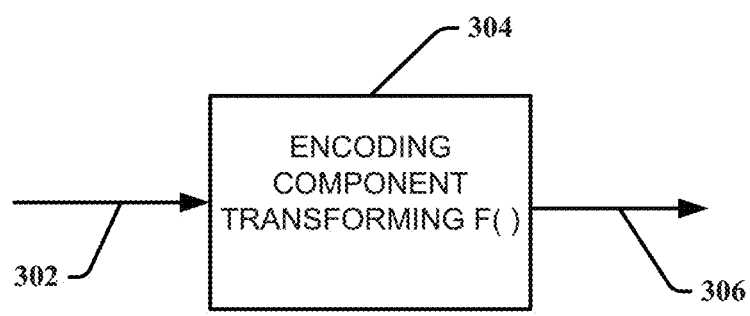
FIG. 3 illustrates encoding component functionality of an input to output transformation function that facilitates conversion of every p dimensional real-valued vector (input) to a binary vector of m bits.

FIG. 3 illustrates an encoding functionality (e.g., refer to encoding component 108, FIG. 1) of an input to output and a transformation function that facilitates this conversion. In these embodiments, a feature is to ensure that an output obtained from processing non-encoded data is not significantly different than that obtained after encoding an input. Moreover, when clustering a given a set of input vectors, focus is generally on form of input namely, real-valued vectors in order to improve effectiveness of data projection transformations against deanonymization attacks. A binary transformation of real-valued data is employed such that the following function referred to as block 304, e.g., $\varphi: R^p \rightarrow \{0, 1\}$ is used to transform p dimensional real-valued vectors (input) referred to as block 302 to a binary vector of m bits referred to as block 306 (output). Through this technique, the binary transformation enables a faster transmission rate of data (as compared to the state of the art) over a network and processing of the data on a server side. This is because it requires only m/8 bytes to store a binary vector of m bits, whereas storing a p dimensional real vector requires at least p×4 bytes of memory. In order to preserve data integrity, the data is encoded such that it is protected from malware or other malware products that detects sensitive information. For example, there are many literatures that propose various data protection methods ranging from pseudo-anonymization of data to adding noise to data. However, these methods do not ensure frequency of data privacy breach attacks, and quality of final output does not change significantly. Hence, embodiments herein provide for ensuring output obtained by confirming that non-encoded data is not significantly different than that obtained after encoding input. Computation of approximate signatures (hash values) for new centroids is performed by using the bit-encoded vectors. This is ensured by placing specific attention towards clustering a given set of input vectors namely real-valued vectors. Through this technique, only encoded data is accessed and hence can be used to preserve privacy. For instance, $SB(x)=b(x_1)b(x_2) \ldots b(x_p)$ and $SB(y)=b(y_1)b(y_2) \ldots b(y_p)$ can be memory-resident signatures of two vectors in a partition (cluster). If $b(x_i)$ XOR $b(y_i)=0$, then it can be stated that both x and y both have $^+$ve or $^-$ve projections on an $i^{th}$ basis vector. Hence x+y can also have projection of the same sign on the $i^{th}$ basis vector, $b(x_i+y_i)=b(x_i)$. If $b(x_i)$ XOR $b(y_i)=1$, then the sign of the projection cannot be stated firmly hence one of the best approaches is to set the bit with probability ½. Embodiments propose a modified K-means algorithm identified as PPK-means which works under an imposed privacy preservation constraint such that it only has access to encoded input, and at no step of executing the algorithm is it allowed to access an original input (unlike some existing approaches of fast approximate K-means in which during different stages of the algorithm it also accesses original data vectors in addition to working with encoded ones).

Upon encoding the data, the next step is to continue the process of PPK-means on this encoded data. Since it is known that a general class of binary transformation functions of real-valued data is a lossy transformation, it is useful to modify the standard K-means clustering algorithm with an objective to enhance performance and be able to work with incomplete information. To continue the process, functionality of the Euclidean and Hamming distance is used.

This section provides further detailed content specific to the Euclidean distances related to the Hamming component 112 identified in FIG. 1. In order to compute the standard K-means algorithm, the input data points are defined and distance between these input data points calculated. In theory, there are various distance measure theorems available to measure data points in any suitable dimension such as Euclidean distance, Cosine, Jaccard, edit distance and many more. In these embodiments, to measure distance between data points and centroids, Euclidean distance theorem is implied. It is the distance between two points in either a plane or n-dimensional space. For example, if data points $(x_1,y_1)$ and $(x_2,y_2)$ are in 2-dimensional space, then the Euclidean distance (d) between them is:

$$d^2=(x_2-x_1)^2+(y_2-y_1)^2$$

Many machine learning algorithms require pairwise similarity measure on input space such as, semi-supervised clustering, nearest neighbor classification and kernel-based methods. Metric learnings use generic function such as Euclidean distance, but it often produces undesirable results. Embodiments can optimize parametric distance functions and thus use of binary codes can be highly effective. Binary codes are storage efficient and have ability to store massive datasets in memory. Thus, Hamming distance, a measuring system on binary codes, can be used; it is used in many scenarios when data retrieval issues are heavily dependent on measure of distance or to identify similarity between vectors (known as bits). This is the basic theme for K-means clustering. For these embodiments, the focus is on optimizing the standard K-means algorithm by utilizing encoded bit vectors and estimating values of the signatures of new centroids during each iteration to facilitate privacy protection.

Figure 4A:
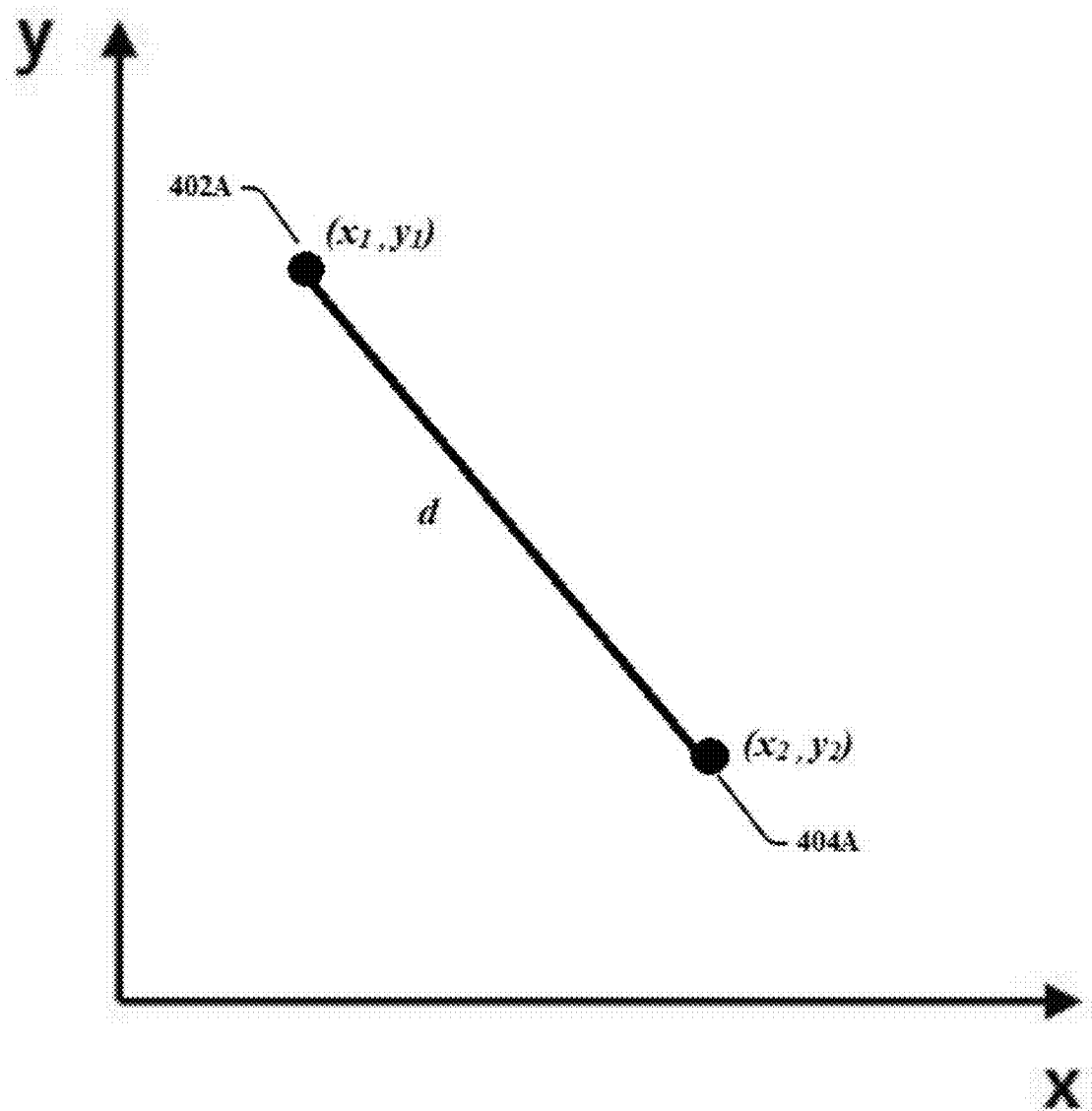
FIG. 4A illustrates an example of a Euclidean distance measurement between points in a Euclidean vector space that can be used by embodiments employing a Hamming component.

FIG. 4A illustrates an example of a Euclidean distance measurement between two data points that are in dimensional space. The example on this drawing can be a typical representation of measurement of Euclidean distance between two data points at block 402A and block 404A where $x_1$ and $x_2$ are numerical values on x-axis and $y_1$ and $y_2$ are numerical values on y-axis. The Euclidean distance formula can be depicted by Pythagorean Theorem stated by formula (1) below wherein d is square root distance. Thus, d can be denoted as Euclidean distance between block 402A and block 404A data points on an axis. This specific illustration e.g., FIG. 4A is focused on two-dimensional space. However, mathematical calculation of Euclidean distance in p-dimension space can be represented by formula (2) below wherein d denotes Euclidean distance in p dimensional space. These embodiments can utilize a common function identified as LSH for transforming Euclidean vector points to Hamming space.

$$d = \sqrt{(x_1-x_2)^2+(y_1-y_2)^2} \quad (1)$$

$$d_E(x,y) = \sqrt{\sum_{i=1}^{p}(|x_i-y_i|)} \quad (2)$$

Figure 4B:
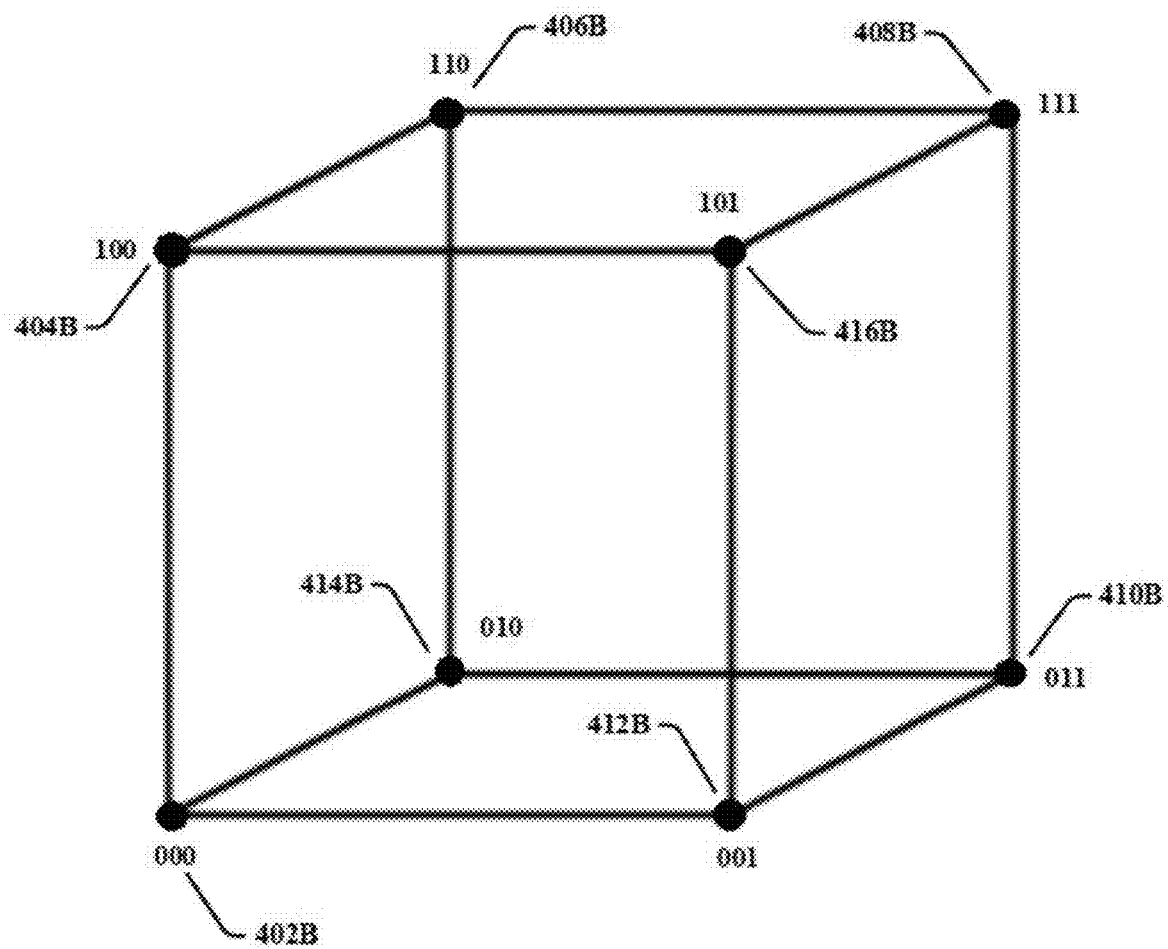
FIG. 4B illustrates an example of calculating minimum distance between two vertices in a 3-dimensional Euclidean space using Hamming distance that can be used in embodiments by a Hamming component.

FIG. 4B illustrates an example to calculate minimum distance between any two vertices using Hamming distance within functionality of the Hamming component. Hamming distance can be used in vector calculations, for instance in general, the Hamming distance between example vectors $x=(x_1, x_2 \ldots x_n)$ and $y=(y_1, y_2 \ldots y_n)$ is denoted by $d_H(x,y)$, is the number of positions where the symbols $x_i$ and $y_i$ differ. That is:

$$d_H(x,y) = \sum_{i=1}^{p}|x_i-y_i|, x, y \in \{0,1\}^p$$

For example, in the simple example of a 3-bit binary cube, the Hamming distance from vertices block 404B to block 408B is 2 as the binary bit depicts the path as block 404B to block 406B and block 406B to block 408B. Similarly, another example is to calculate distance between vertices block 414B and block 416B. From block 414B, the distance is calculated as three as the binary bit depicts the path as block 414B to block 402B, block 402B to block 412B and block 412B to block 416B. This analogy can be used for any N-dimensional space and thus it calculates its Hamming distance accordingly. Some concepts that are used to estimate centroids during PPK-means iterations under privacy preservation constraints are Euclidean and Hamming vector spaces, vector sum for centroid computation and estimating optimal centroids. In theory, a vector space V is represented by D which is a set of vectors with each component belonging to a specific domain (e.g. real numbers) and M which is a distance metric, which takes two vectors as input and outputs a non-negative real number. More formally:

$$V:(\mathcal{D}, \mathcal{M}); \mathcal{M}:(x,y) \mapsto \mathbb{R}, x,y \in \mathcal{D}.$$

Two vector spaces that are relevant in context of privacy preserving clustering are i) $\mathbb{R}^p$ where a p dimensional real vector space with $L_2$ ($d_E(x,y)$ is the Euclidean) distance metric, and ii) $H^m$: an m dimensional Hamming space of vectors with binary (0/1) components with $L_1$ distance metric, commonly known as the Hamming distance $d_H(x,y)$. The corresponding equations for i and ii are displayed below:

$$d_E(x,y) = \sqrt{\sum_{i=1}^{p}(|x_i-y_i|)}$$

$$d_H(x,y) = \sum_{i=1}^{m}(|x_i-y_i|)$$

For different applications, it is useful to transform points from one space to another. In general, a transformation is useful if it is distance preserving, e.g., two points that are close in one space before transformation should remain nearby in the transformed space as well. However, φ can be a transformation function which maps points from a p dimensional Euclidean space to points in Hamming space of m dimensions, i.e., φ: w∈$R^p$→x∈$H^m$ A common function for transforming points in a Euclidean vector to those in the Hamming space, is locality sensitive hash function (LSH) as mentioned above. The LSH based approach involves randomly choosing a set of m basis vectors; each point is then transformed by computing signs of projections of the point with these m basis vectors yielding the m components of the transformed point in the Hamming space (the transformed point is often called a signature of an original data point). Formally speaking, the $i^{th}$ component of the transformed vector in Hamming space is given by:

$$x_i = \text{sgn}(w \cdot b_i)$$

where w is the vector in the original space, $b_i$ is the $i^{th}$ basis vector and sgn(z) is the sign function. As per Johnson-Lindenstrauss (JL) lemma, this transformation is distance preserving. A super-bit algorithm improves on likelihood of semantic hashing (similar signatures corresponding to similar points and dissimilar signatures otherwise) by applying orthogonalization on randomly chosen basis vectors with help of Gram-Schmidt algorithm. Among various choices for the transformation function, φ: $R^p$→$H^m$, these embodiments apply the super-bit algorithm to define φ.

Figure 7:
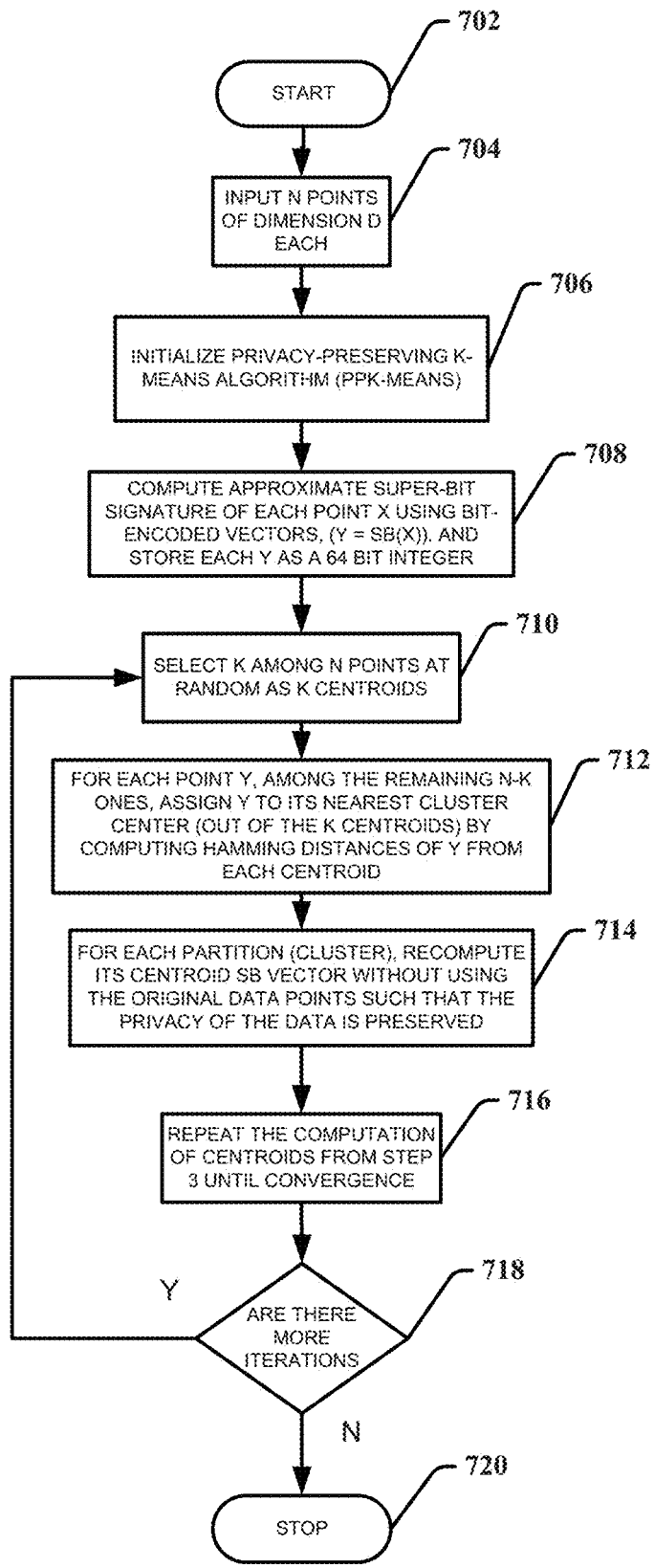
FIG. 7 illustrates a flow chart of a Privacy-Preserving K-means (PPK-means) algorithm.

Similar to the naive approach of clustering for standard K-means over Hamming space on encoded data and a possible embodiment of block 714 in FIG. 7, K-means on an encoded set (PPK) is executed for binary vectors (signatures) in m dimensions. However, instead of treating the embedded space as the extended space of m dimensional real vectors, $R^m$, the embedded space to the discrete space $H^m$ is restricted. Consequently, the standard notion of the vector sum operation involving component-wise addition is no longer a closed operation in $H^m$, which requires redefining this operation to be able to execute K-means. In particular, kth cluster centroid is computed as:

$$h_{ki} = \text{sgn}\left(\frac{1}{|X_k|} \sum_{x \in X_k} x_i - \frac{1}{2}\right), x \in H^m, k = 1, \ldots, K, i = 1, \ldots, m,$$

where a modified vector centroid operation is used. It can easily be verified that this is a closed operation, e.g., $h_k \in H^m$. Informally speaking, in the above equation, first the computation of centroid vectors $h_k$'s over the extended space $R^m$ is performed and then to maintain closure property, a centroid $h_k$ is mapped to its nearest point in the Hamming space. This mapping to the nearest neighbor in $H^m$ is performed in a component-wise manner using the sgn function from the equation mentioned above, because the space $R^m$ is both uniformly and point-wise convergent. Since these embodiments of block 714 in FIG. 7 compute centroids using the Euclidean space and then 'truncates' these centroids to a nearest point in the Hamming space, this baseline is called 'E2HK-means' (Euclidean to Hamming convergent K-means).

Many algorithms use binary bits to preserve Euclidean metric structure of input data and Locality-sensitive hashing (LSH) is one of the well-known examples for this scenario. As noted, a common function for transforming points in a Euclidean vector to those in Hamming space is a locality sensitive hash function (LSH). Locality sensitive hashing is a general class of data compression methods which seek to assign identical hash codes (called signatures) to vectors that are similar to each other. A commonly used LSH algorithm, called MinHash, involves intersection of random permutations of components in data. An LSH for a similarity S is a probability distribution over a set H of hash functions such that $Pr_h[h(A)=h(B)]=S(A,B)$ for each data point. LSH is used in many applications such as near-duplicate detection, near-neighbor search, sketching and clustering. Some examples of use of LSH are to filter out duplicates of scraped web pages at faster speed or to perform near constant time lookup of nearby points from a geo spatial data set. A traditional use of hash function is in the Hash table. Values stored in a data structure is called the Hash table. Hash functions used in a Hash table are designed to map data to an integer and it is then used to identify a particular bucket within the hash table to extract or delete an element. LSH is designed such that hash value collisions are likely combined for two input values that are at close proximity than for inputs that are far apart. There are various implementations of LSH functions as it depends on data types and definitions of data proximity. One well known hashing technique used in LSH is random projects hash function. An advantage of randomized hash function is that if any probabilistic statements are made about performance of the function, then it equally applies to the data and not some data sets. The LSH based approach involves randomly choosing a set of m basis vectors in which each point is then transformed by computing signs of projections of the points with the m basis vectors thus yielding m components of the transformed points in the Hamming space (the transformed point is often called a signature of the original data point).

Figure 4C:
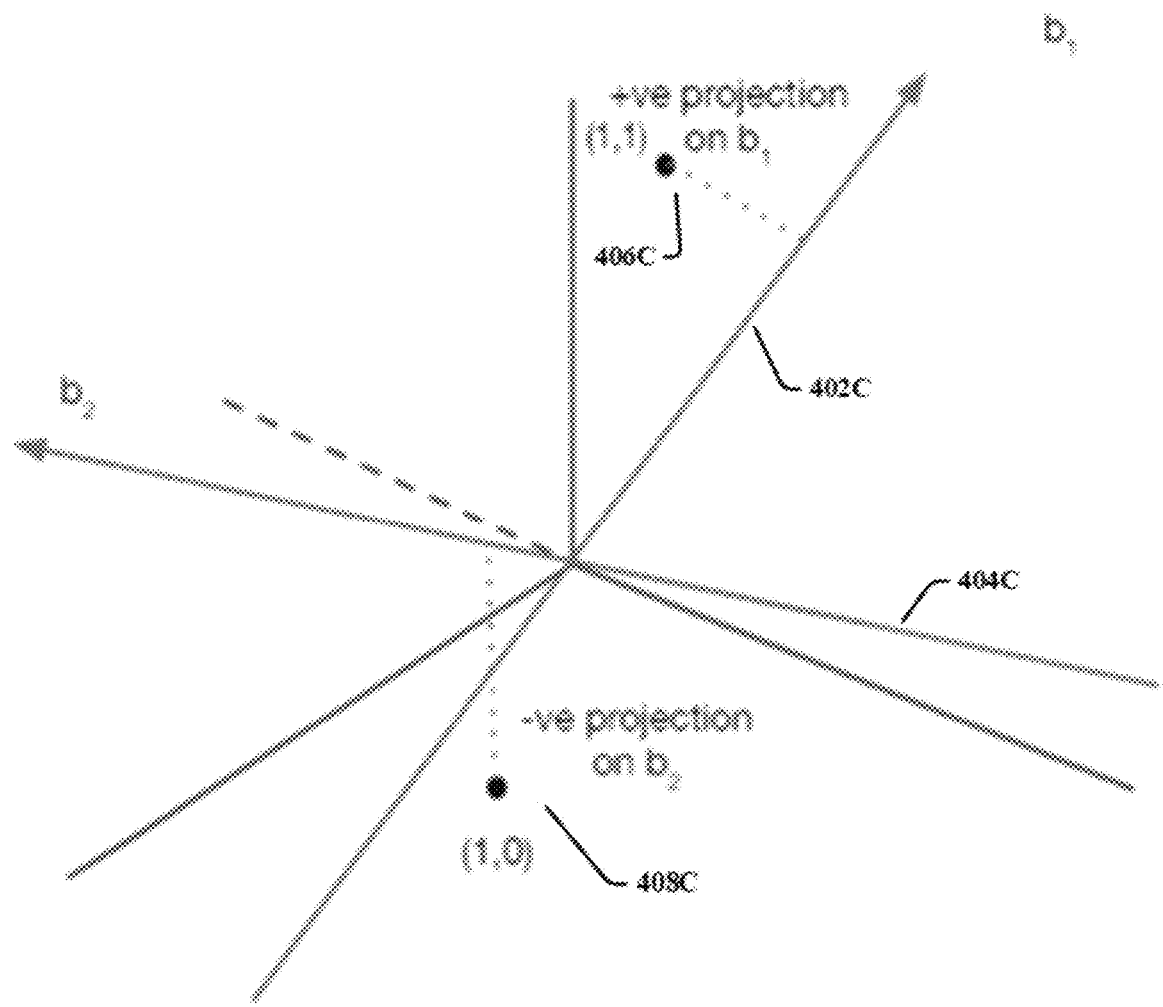
FIG. 4C illustrates a visual depiction of Local Sensitive Hashing (LSH), which is a function that transforms points in a Euclidean vector to those in a Hamming space which can be used by a Hamming component.

FIG. 4C illustrates a visual depiction of Local Sensitive Hashing (LSH) using projections over random basis vectors for the purpose of transforming points in a Euclidean vector space to a Hamming space as described in FIG. 4A and FIG. 4B above. In this example, the representation illustrates the Local Sensitive Hashing algorithm for data points in a three-dimensional space. The LSH algorithm is an extension of MinHash based LSH to real-valued vectors in high dimensions by taking projections with respect to randomly chosen basis vectors block 402C and block 404C and computing projections of each data point at block 406C and block 408C onto each vector at block 402C and block 404C. If the projected value is greater than 0, then set the $i^{th}$ bit to 1 otherwise 0. Through this way, each data point at block 406C and block 408C is coded as a bit vector. LSH is a general class of data compression methods which seeks to assign identical hash codes (called signatures) to vectors that are similar to each other. The LSH algorithm (MinHash), involves intersection of random permutations of components in data.

A novelty aspect of various embodiments is to estimate signatures of new centroids instead of computing true signatures and therefore leading to a faster completely memory-resident algorithm and facilitate preservation of privacy as compared to the state of the art. In FIG. 1, the estimating component 114 serves a significant function of the embodiments and the following describes execution of estimation as a totality in connection with various embodiments. A constraint of encoded data makes it desirable to devise an effective method to estimate centroid vectors during PPK-means iterations with incomplete information from binary encoded input data vectors. The closer the estimated centroid vectors can be to true centroids (which are computed from the non-encoded data vectors without privacy preservation constraint), the precision of the output values can be higher. Hence, these embodiments propose use of a Gaussian mixture model as part of a solution to estimate bit values of centroid vectors during the intermediate computational steps. This requires sending some additional information to the server in the form of averages and variances of projected values of the data vectors along a set of randomly chosen basis vectors. The additional statistics provides more reliable information about estimating centroid vectors.

Due to privacy preservation settings, it is not generally feasible to compute a Centroid in Euclidean space and then transform it to a specific point in Hamming space. Therefore, under privacy preservation settings, a way to compute Hamming space centroid vectors is to estimate these values probabilistically with incomplete information rather than computing deterministically. Considering the transformation function φ, this aggregate function equates to a sum of signs of projected values, which can in turn be approximated with a sign of sums of projections.

$$\hat{h}_{ki} = \sum_{w \in W_k} \text{sgn}(w_i \cdot b_i) \approx \text{sgn}\left(\sum_{w \in W_k} w_i \cdot b_i\right)$$

Although vectors w's in the above equation are not known due to privacy constraints, the projected values themselves or signs of these values may be considered to be made available to a server for purpose of computation without posing a major security threat. Privacy in this case is preserved from a well-known property of locality preserving property of JL lemma that devising an inverse function of φ is computationally intractable. An intuition that is now built on for estimating value of an $i^{th}$ signature bit of a sum vector is that adding together a considerably higher number of positive projected values than a smaller number of negative ones is likely to yield a positive value as the sum due to an outweighing effect of positive values over negative values. In addition to frequency of positive projections, average magnitude values and skewness of these values can also affect likelihood of the sum being positive. To model these factors formally, a Gaussian mixture model (GMM) is used to estimate likelihood of the $i^{th}$ bit of the sum vector to be 1.

The concept explained above underlays a theory to obtain estimates of centroid computations under privacy preserving constraints. The proposed Gaussian based estimation of centroid vector from encoded vector components and global statistics about input data is discussed below in detail. The equation below can be depicted by B, such that a set of projected values for an $i^{th}$ basis vector can be represented by:

$$B_i \bigcup_{w \in W} w \cdot b_i$$

The set B, can be split in two parts according to whether projection values are positive or negative and assume that the values in each set are generated by a normal distribution, e.g., such that $B_i = P_i \cup N_i$, such that $P_i = \{w_i \cdot b_i | w \cdot b_i \geq 0\}$, $w \cdot b_i \sim \mathcal{N}(\mu_i^+, \sigma_i^+)$ $N_i = \{w_i \cdot b_i | w \cdot b_i < 0\}$, $w \cdot b_i \sim \mathcal{N}(\mu_i^-, \sigma_i^-)$ where $\mu_i+$ and $\mu_i-$ denote average values of positive and negative projections respectively. Parameters of normal distributions corresponding to each component are computed from observed projection values, e.g., $\mu_i+$ and $\sigma_i+$ are computed from $P_i$ values. During each iteration, a privacy preserving K-means algorithm assigns the $i^{th}$ component (bit) of a Hamming vector corresponding to a centroid (vector sum) of $k^{th}$ partition, $h_{ki}$, to a value of 1 or 0. This binary classification problem thus involves estimating a value of the sum of a set of projection variables (some positive and some negative). The assumption here is that the positive and the negative projections (e.g., the ones encoded as 1's and 0's respectively) are drawn from two separate distributions. The focus is on underlying distribution of sum of these variables. As a step to estimate the sum, state a well-known result that the sum of two normally distributed random variables is also normal. These embodiments can use the theoretical equation below:

If $Y_1 \sim \mathcal{N}(\mu_1, \sigma_1^2)$ and $Y_2 \sim \mathcal{N}(\mu_2, \sigma_2^2)$ then the sum of these random variables $Y = Y_1 + Y_2 \sim \mathcal{N}(\mu_1 + \mu_2, \sigma_1^2 + \sigma_2^2)$.

The equation above can be proved using a characteristic function of normal distributions. In the context of this problem, assume that the sum of a set of encoded bit values corresponding to an arbitrary partition is drawn from sums of $P_i$ and the $N_i$ values. From the equation above, x follows the distribution $u_i$.

$$x \sim \mathcal{N}(\mu_i^+ + \mu_i^-, (\sigma_i^+)^2 + (\sigma_i^-)^2)$$

A value sampled from the distribution is the best guess for the sum of an arbitrary number of reals representing an $i^{th}$ component of data vectors belonging to a partition. In order to classify a sampled value x into one of the classes (e.g., 1 or 0) for a current partition of encoded vectors, leverage the following two sources of information from the observed encoded vectors in each partition to estimate likelihood of the $i^{th}$ bit of the sum vector in each partition to be 1 (the likelihood of the bit to be set to 0 represents a complementary event). (1) If the number of positive projections in a partition contributing to a sum (e.g., the number of vectors with the $i^{th}$ bit observed to be 1) is considerably higher than the number of negative projections, there is a considerable likelihood of the $i^{th}$ bit of the sum vector to be 1.

(2) If the positive values on average are considerably higher than the negative ones over the whole dataset, there is a strong likelihood of the $i^{th}$ bit of the sum of the vectors in any partition to be 1.

Figure 5:
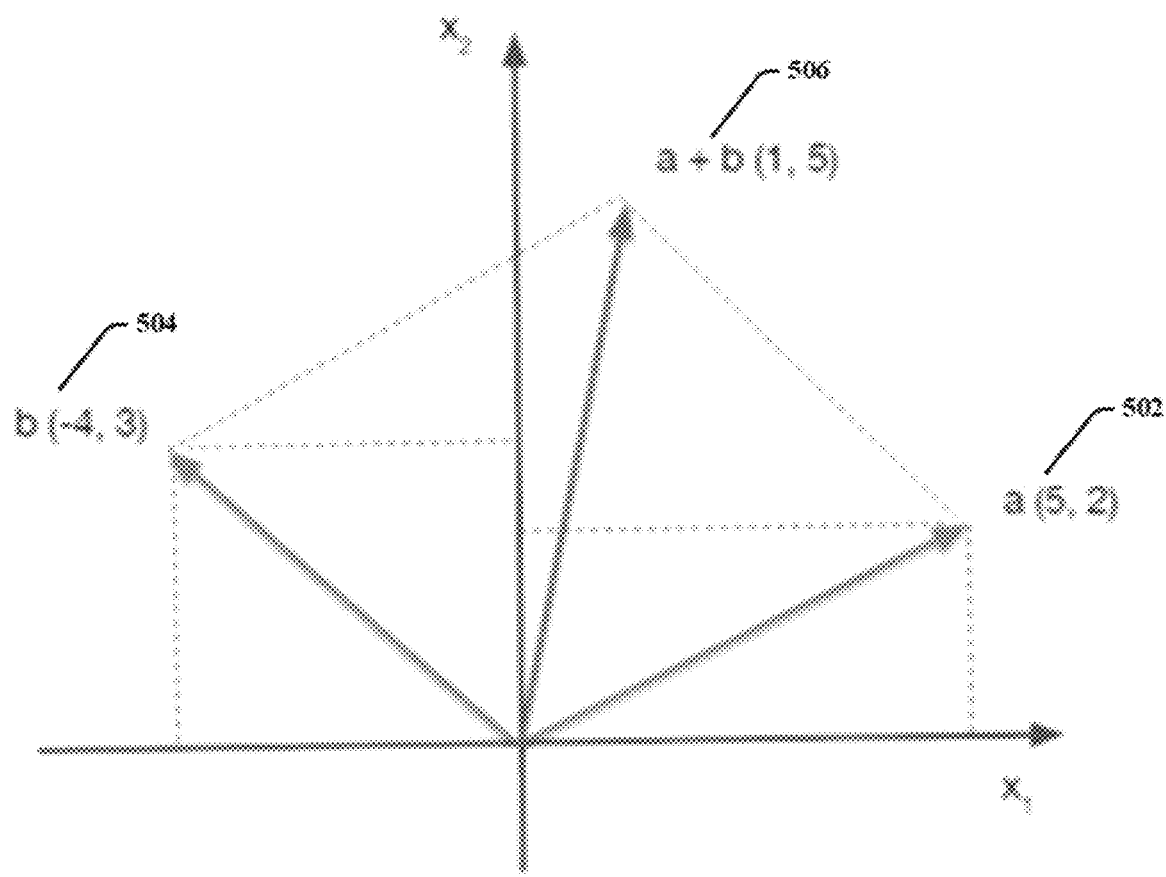
FIG. 5 illustrates a geometry of re-computing approximate (estimated) signatures for centroids that can be used by an estimating component.

FIG. 5 is a geometric illustration of re-computing estimated value of signatures for centroids. There are multiple methods to compute approximate signatures for new centroids. In this figure, the data point 'a' labelled at block 502 can be depicted as projection $p_{x1}$ (wherein $p_x$ represents projection) on $x_1$ axis wherein $p_{x1}(a)$ is 5, e.g., $p_{x1}(a) > 0$, whereas the data point 'b' labelled at block 504 can be depicted as projection $p_{x1}$ on $x_1$ axis wherein $p_{x1}(b)$ is −4, i.e. $p_{x1}(b) < 0$. Also, projection of 'a' and 'b' on $x_1$ and $x_2$ axis labelled at block 506 is 1 and 5, e.g., $p_{x2}(a) > 0$, $p_{x2}(b) > 0$ and thus $p_{x2}(a+b) > 0$. However, it is not possible to compute whether $p_{x1}(a+b) > 0$ without computing $p_{x1}(a)$ and $p_{x1}(b)$. Hence, computation of $p_{x1}(a+b) > 0$ becomes a 50-50 chance using method 1(which is not ideal). This method 1 uses existing signatures to recompute approximate signatures of new centroids and there is no space for extra storage. An issue with method 1 is that there are too many random choices when bits are different. Hence, method 2 is proposed wherein, extra binary storage is allocated along with signatures to indicate whether projections are higher (1) or lower (0) than average projection value. For every vector x, allocate another M bits (M being an integer, e.g., 64 bits)

depicted by expression SBAVG(x), where the $i^{th}$ bit is 1 if $x.b_i > 1/N * \text{vec-sum}(z.b_i)$ for z in collection. Then during centroid re-computation, when $SB(x_i)$ and $SB(y_i)$ are different, check if $SBAVG(x_i)=SBAVG(y_i)$. If SBAVG(xi)=SBAVG($y_i$), then both projections are higher than the average and can conclude that projection of x+y on $b_i$ can be $SB(x_i)$. The random choice happens only for the complementary case and thus much less random decisions for signature estimation of x+y.

As stated previously, using the terminology that $B^k_i$ refers to the set of observed signs of projected values (encoded bit representations), e.g., $$B^k_i \bigcup_{w \in W_k} \text{sgn}(w \cdot b_i) = P^k_i \cup N^k_i$$

$$P^k_i = \{\text{sgn}(w \cdot b_i) \mid \text{sgn}(w \cdot b_i) \geq 0\}, w \in W_k$$

$$N^k_i = \{\text{sgn}(w \cdot b_i) \mid \text{sgn}(w \cdot b_i) < 0\}, w \in W_k$$

estimate posterior probability of a positive class in a $k^{th}$ partition as:

$$P(h_{ki} = 1 \mid B^k_i) = \frac{|P^k_i|}{|B^k_i|}$$

An issue with maximum likelihood priors is that, it does not take into account relative magnitudes of average values of positive and negative projections. To this end, method 2 can be formulated by addressing two events in a sampling process. The first is to select a component (either positive or negative) by observing respective counts in a partition, and second is sampling a value from that component. Stating this formally, the probability of the $i^{th}$ centroid bit being set to 1 (the positive class) is given by $$P(h_{ki} = 1 \mid B^k_i) = \frac{|P^k_i|}{|B^k_i|} \frac{1}{\sqrt{2\pi} \sigma^+_i} \exp\left(-\frac{(x - \mu^+_i)^2}{2\sigma^{+2}_i}\right)$$

where the variable x represents a sample drawn from the equation mentioned above.

In the content described above, a Gaussian mixture model (GMM) was described with two components corresponding to the positive and negative projection values. In addition to this, the details below generalize the idea further by defining multiple components for positive and negative projections. GMM with multiple components may model significant differences between the projection values of the same sign. With a binary GMM, the only parameter that can handle these differences is the variance parameter $\sigma^+_i$ (or $\sigma^-_i$ for the negative projections). However, a multiple number of components, where each component generates projected values of the same sign (either positive or negative) within specific ranges, provides an estimate about a magnitude of values, as opposed to estimating only its difference from the average in the binary case. This estimate about the magnitude may potentially result in improving the estimate for sign of $h_{ki}$, where an absolute value of sum of a small number of projections could be higher than those of a much larger number of projections of opposite sign. To enable a more fine-grained approach to count priors and posteriors, assume that a set of projected values follow a multi-component Gaussian mixture model, where values within a specific range are assumed to be generated from one particular component of the Gaussian mixture. In these embodiments, positive and the negative projected values are divided into a number of M (a parameter) equal length intervals. More specifically, the global statistics of the projected values are stored along each dimension i as:

$$B_i = (\cup_{j=1}^M p_i^j) \cup (\cup_{j=1}^M N_i^j), \text{ such that}$$

$$p_i^j = \{w_i \cdot b_i \mid j\delta \leq w_i \cdot b_i < (j+1)\delta\}, w_i \cdot b_i \sim \mathcal{N}(\mu_i^{j+}, \sigma_i^{j+})$$

$$N_i^j = \{w_i \cdot b_i \mid j\delta \leq w_i \cdot b_i < (j+1)\delta\}, w_i \cdot b_i \sim \mathcal{N}(\mu_i^{j-}, \sigma_i^{j-})$$

where each $P_i^{(j,k)}$ ($N_i^{(j,k)}$) represents a Gaussian generating positive (negative) projection values of the points within the $j^{th}$ interval (j=1, ..., M), $\mu_i^{+j}(\mu_i^{j-})$ and $\sigma_i^{j+}(\sigma_i^{j-})$, respectively, refer to an average and variance of positive (negative) projected values within a $j^{th}$ interval, and $\delta$, the length of each interval, is computed as $((w_i \cdot b_i)_{max} - (w_i \cdot b_i)_{min})/M$. Similar to the binary case mentioned above, to obtain the distribution of the sum, sample a likely value of the projection of the sum vector from the distribution $$x \sim \mathcal{N}\left(\sum_{j=1}^M (\mu_i^{j+} + \mu_i^{j-}), \sum_{j=1}^M ((\sigma_i^{j+})^2 + (\sigma_i^{j-})^2)\right).$$

During clustering, z denotes the latent variable indicating the component from which the sum of the projection along the $i^{th}$ dimension (denoted by x) is most likely to be sampled from. Using uniform priors, the maximum likelihood value of this latent variable is then estimated as $\zeta^+$ when x >0 and $\zeta^+$ otherwise. Mathematically, $$P(z = \zeta^+ \mid x) = \underset{j=1}{\overset{M}{\text{argmax}}} \frac{1}{\sqrt{2\pi} \sigma_i^{j+}} \exp\left(-\frac{(x - \mu_i^{j+})^2}{2\sigma_i^{j+}}\right), \text{ if } x > 0,$$

$$P(z = \zeta^- \mid x) = \underset{j=1}{\overset{M}{\text{argmax}}} \frac{1}{\sqrt{2\pi} \sigma_i^{j-}} \exp\left(-\frac{(x - \mu_i^{j-})^2}{2\sigma_i^{j-}}\right), \text{ if } x \leq 0,.$$

That is, use N ($\mu_i^{j+}, \sigma_i^{j+}$)'s as the posteriors when x >0 and N ($\mu_i^{j-}, \sigma_i^{j-}$)'s otherwise. Next, after estimating values of z=$\zeta^+$(or $\zeta^-$), compute likelihood of $h_{ki}$, by using local priors following the below equation:

$$P(h_{ki} = 1 \mid B^k_i, z) = \frac{P^k_i}{|B^k|} \frac{1}{\sqrt{2\pi} \sigma_i^{\zeta^+}} \exp\left(-\frac{(x - \mu_i^{\zeta^+})^2}{2\sigma_i^{\zeta^+}}\right), \text{ if } x > 0$$

$$P(h_{ki} = 0 \mid B^k_i, z) = \frac{N^k_i}{|B^k|} \frac{1}{\sqrt{2\pi} \sigma_i^{\zeta^-}} \exp\left(-\frac{(x - \mu_i^{\zeta^-})^2}{2\sigma_i^{\zeta^-}}\right), \text{ if } x \leq 0$$

Here, $P_{ki}$, and $B_{ki}$, are defined. The multi-component case of the above equation is a generalization of the binary component case, the generalization ensuring that the posteriors are estimated over a small (and hence more reliable) range of values. It is to be noted that multiple components only apply to the posteriors and not to the local priors of each cluster which are still binary as per the definition $B^k_i$ which refers to the set of observed signs of projected values (encoded bit representations). The algorithm is more formally presented below:

| Algorithm 1: PPK-Means |
|---|

```
    Input: X: A transformed set of vectors on H^m using superbit algorithm (18)
    Input: K: # clusters
    Input: M: # components
    Input: μ_i^{j+} (μ_i^{j-}) and σ_i^{j+} (σ_i^{j-}): mean and variance of positive (negative) projected values
           within j^th component in i^th dimension
    Input: T: maximum number of iterations
    Input: MGMM: Time in multi component GMM to be used
    Output: K-partition of X such that ∪_{k=1}^K B^k = X
 1  begin
 2  |  Randomly initialize K cluster centres e^1, ..., e^K in X
 3  |  for i= 1, ..., T do
 4  |  |  for each x ∈ X - ∪_{k=1}^K {e^k} do
    |  |  |  // Assign x to its nearest cluster centre
 5  |  |  |  k' ← arg min_k (d_H(x,e^k))
 6  |  |  |  B^{k'} ← B^{k'} ∪ x
 7  |  |  end
 8  |  |  for k = 1, ..., K do
    |  |  |  // Recompute cluster center
 9  |  |  |  for i = 1, ..., m do
10  |  |  |  |  for each x ∈ B^k do
11  |  |  |  |  |  P_i^k = P_i^k + x_i
12  |  |  |  |  end
13  |  |  |  |  N_i^k = |B^k| - P_i^k
14  |  |  |  |  if MGMM then
15  |  |  |  |  |  x ← 𝒩 (Σ_{j=1}^M (μ_i^{j+} + μ_i^{j-}), Σ_{j=1}^M ((σ_i^{j+})^2 + (σ_i^{j-})^2))
16  |  |  |  |  |  if x > 0 then
17  |  |  |  |  |  |  ζ^+ = arg max_{j=1}^M 𝒩 (x|μ_i^{j+}, σ_i^{j+})
18  |  |  |  |  |  |  S^+ = (P_i^k / |B^k|) 𝒩(x | μ_i^{ζ+}, σ_i^{ζ+})
19  |  |  |  |  |  |  if rand(0, 1) ≤ S^+ then e_j^k = 1
20  |  |  |  |  |  |  else e_j^k = 0
21  |  |  |  |  |  else
22  |  |  |  |  |  |  ζ^- = arg max_{j=1}^M 𝒩 (x|μ_i^{j-}, σ_i^{j-})
23  |  |  |  |  |  |  S^- = (P_i^k / |B^k|) 𝒩(x | μ_i^{ζ-}, σ_i^{ζ-})
24  |  |  |  |  |  |  if rand(0, 1) ≤ S^- then e_i^k = 0
25  |  |  |  |  |  |  else e_i^k = 1
26  |  |  |  |  else
27  |  |  |  |  |  if rand(0, 1) ≤ P_i^k / |B^k| then e_i^k = 1
28  |  |  |  |  |  else e_i^k = 0
29  |  |  |  end
30  |  |  end
```

This algorithm as it executes can produce k amount of clusters.

Figure 6:
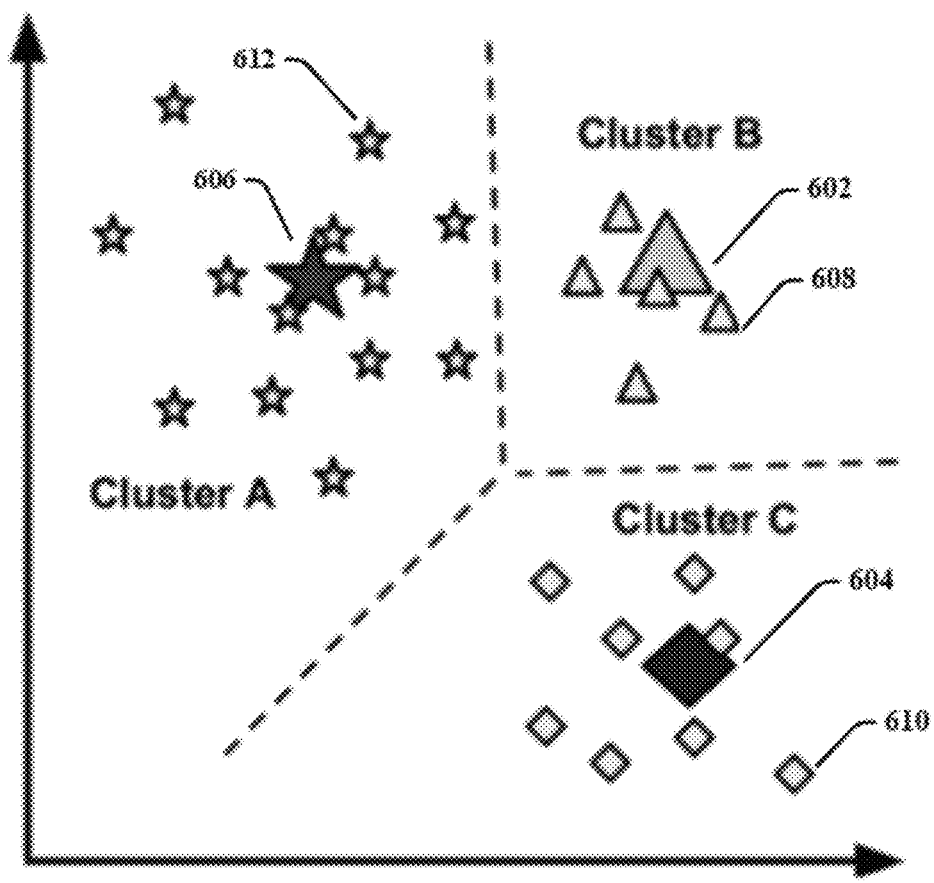
FIG. 6 illustrates a basic concept of clustering that can be applied to many real-world applications which can be used by a Clustering component.

FIG. 6 illustrates a concept of clustering that can be applied to many real-world domains. For instance, this figure is an illustration that can be used as sample data points for potential various tumor sizes that are shown as three uniquely identified clusters. This drawing can be a typical representation of various clustering algorithms and computation of centroids. The drawing illustrates three clusters namely clusters A, B and C identified in their respective axes. The sample data points in each cluster are labeled as blocks 608, 610 and 612 along with additional data points within each cluster area. The idea behind a clustering algorithm is to classify a given set of data points into k number of disjoint clusters such as A, B, and C as shown in the illustration. The algorithm is executed in two phases: the first phase is to define centroids for each cluster and in this example the centroids are labelled at blocks 602, 604, 606. The next phase is to associate each data point to its corresponding nearest centroid such as blocks 608, 610, and 612. Thus, data points with similar characteristics can be grouped to their corresponding cluster. Many businesses use these algorithms to separate customers sharing similar characteristics. One such industry is healthcare, as stated above, where a hospital might cluster patients based on respective tumor size so that patients with different tumor sizes can be treated differently. This technique helps organize unstructured data and it can be used in other areas such as tabular data, images, text data as well. For these embodiments the Locality Sensitive Hashing (LSH) can be used for core of a clustering component. LSH is a general class of data compression methods which seeks to assign identical hash codes (called signatures) to vectors that are similar to each other. As noted, a commonly used LSH algorithm, called MinHash, involves intersection of random permutations of the components in data. The proposed algorithm is an extended MinHash based LSH to real-valued vectors in high dimensions by taking projections with respect to randomly chosen basis vectors. The method proposed in these embodiments partitions the data into K classes such that for a given value of K, compute the LSH signature of each data point ranging from 1 to K and then group together the data points by respective binary encoded signature values. This ensures that similar points are clustered together (since they are expected to have similar signatures). In this algorithm, the K-means computation only needs to access the binary encoded signature values, and as a result it is privacy preserving. For these embodiments, this baseline approach is named as 'LSH-partition'.

It should be noted, that in a cybersecurity concerned world, privacy preserving computation is of significant importance in a cloud computing environment where a client, often requires to send sensitive data to servers offering computing services over untrusted networks. Eavesdropping over a network or malware at a server may lead to leaking information from the data. To prevent information leakage, a common practice is to encode input data with the constraint that such an encoding should not ideally yield computational results that are considerably different from results obtained on true (non-encoded) data. The proposed embodiments are capable of privacy preservation in the sense that it requires as input only binary encoded data and is not allowed to access the true data vectors at any stage of the computation.

FIG. 7 illustrates a flow chart of a Privacy-Preserving K-means (PPK-means) algorithm. A first step of the process is input of data points at block 704 (as it would be conducted in any K-means algorithm). As points are loaded in D dimensional space, the PPK-means algorithms is initialized at block 706. Computation of approximate super-bit signature is executed at block 708 (can be facilitated by an encoding component 108 (FIG. 1). Super-bit signature coding applies the Gram-Schmidt process to orthogonalize the random basis vectors before computing the projections (Refer to FIG. 5 regarding projections). When centroids are selected at block 710 for each cluster, embodiments use Hamming distance that is identified at block 712 (can be facilitated by a Hamming component 112 (FIG. 1)) and assigns data points to a nearest cluster. Through each iteration at block 714, embodiments recompute approximate signatures of new centroids using bit-encoded vectors. This process is repeated from block 710 until convergence of data points are encompassed into their corresponding clustered centroid. In general, the number of iterations range between 50-100 iterations. Upon the execution of these iterations, if a limit is not reached, then the process is repeated from block 708 which is then followed by blocks 710, 712, 714 and 716. Blocks 714 & 716 can be facilitated by the combination of the estimating component 114 and the clustering component 110 working in combination (FIG. 1). If there are no more iterations to be executed at block 718, then the algorithm is completed at block 720 and the data points are clustered in their corresponding families along with their centroids within each cluster. In these embodiments, the transformation of Euclidean vectors to Hamming vectors is distance preserving such that the Euclidean vectors can be of close proximity if the Hamming vectors are also close or vice versa. In theory, centroid computation can be performed in Hamming space however, this idea does not validate that the centroid in the Euclidean space can represent the true centroid. Hence, these embodiments, assist to get accurate approximation such that the centroid in the Hamming space is proximate to the real centroids in the Euclidean space. Also, these embodiments ensure privacy preserving such that, from block 712, the vectors can be part of Hamming space and is not required to go back in the process to read the true Euclidean vectors.

Figure 8:
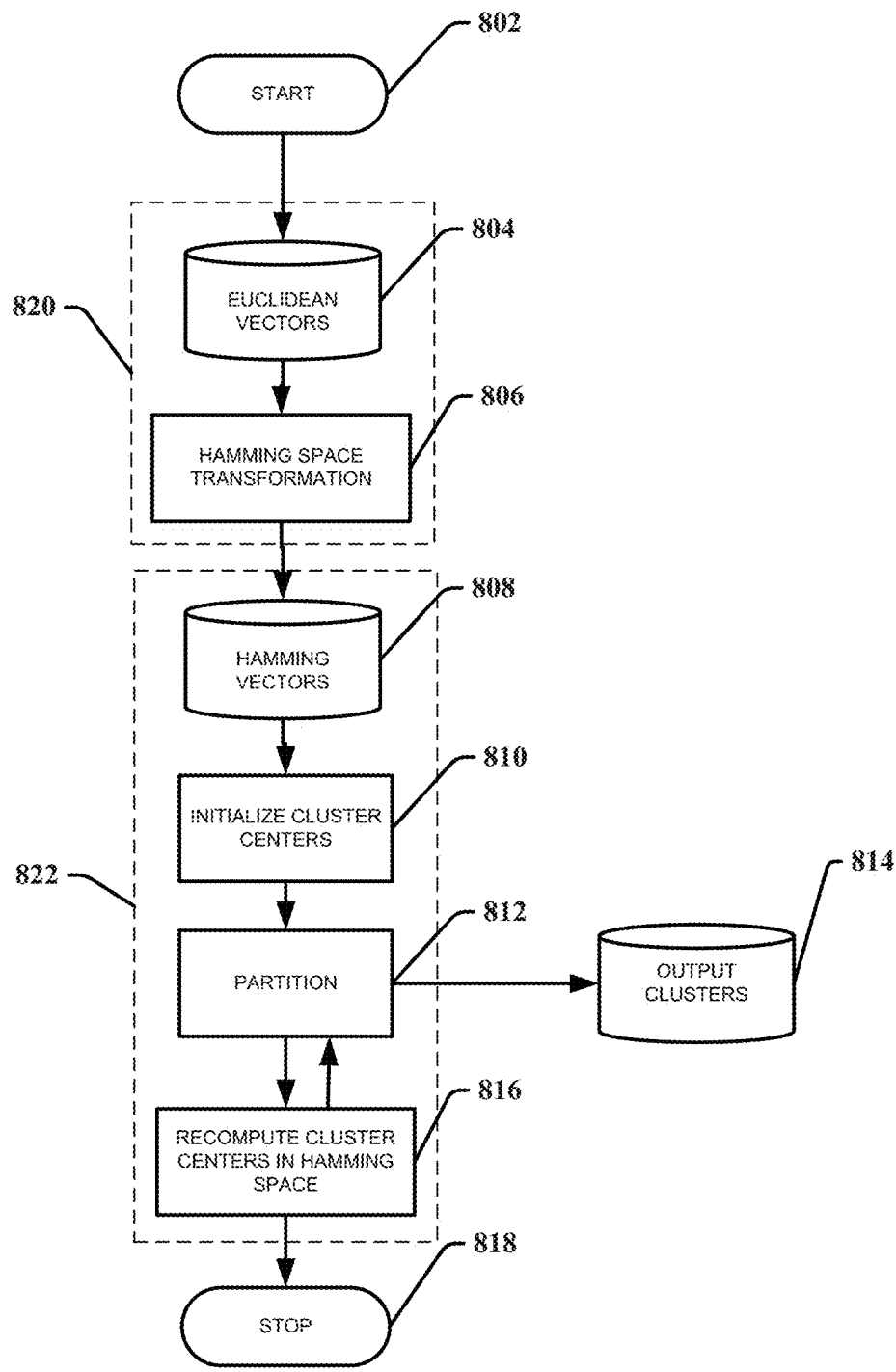
FIG. 8 illustrates a flow chart of a Privacy-Preserving K-means (PPK-means) algorithm in reference to trusted and untrusted servers through a process.

FIG. 8 illustrates a flow chart of the Privacy-Preserving K-means (PPK-means) algorithm in reference to trusted and untrusted servers. Euclidean vectors labelled at block 804 reside on a trusted server identified at block 820. Before data is passed to an untrusted server identified at block 822, where the clustering algorithm is implemented, the data is processed to Hamming space for transformation at block 806. True vector data can be completely secure and invulnerable in the untrusted server at block 822 for any type of data breach. The Hamming vectors at block 808 can be processed to the untrusted server labelled at block 822 such that the vectors cannot get data back from the Euclidean vectors at block 804. As Hamming vectors are now in the untrusted server at block 822, the Privacy-Preserving K-means (PPK-means) clustering algorithm is executed, wherein the cluster centers are initialized at block 810, partitioned at block 812 and provide the segregated clusters at block 814. The re-computation process for clusters in Hamming space is executed at block 816 until the completion of iterations or convergence of data points and thus completes the process at block 818. Two significant points in these embodiments is: (1) the transformation which encodes the input is difficult to decode and therefore respects the privacy preservation criteria; and (2) is the re-computation of cluster centers that tries to approximate true vectors. Hence, a novelty in these embodiments is in the Hamming space transformation and thus should be able to run PPK-means without reading back from the original vectors. The re-computation of centroids ensures that the clusters in the Hamming space can closely resemble the clusters in the original space of Euclidean vectors.

Figure 9:
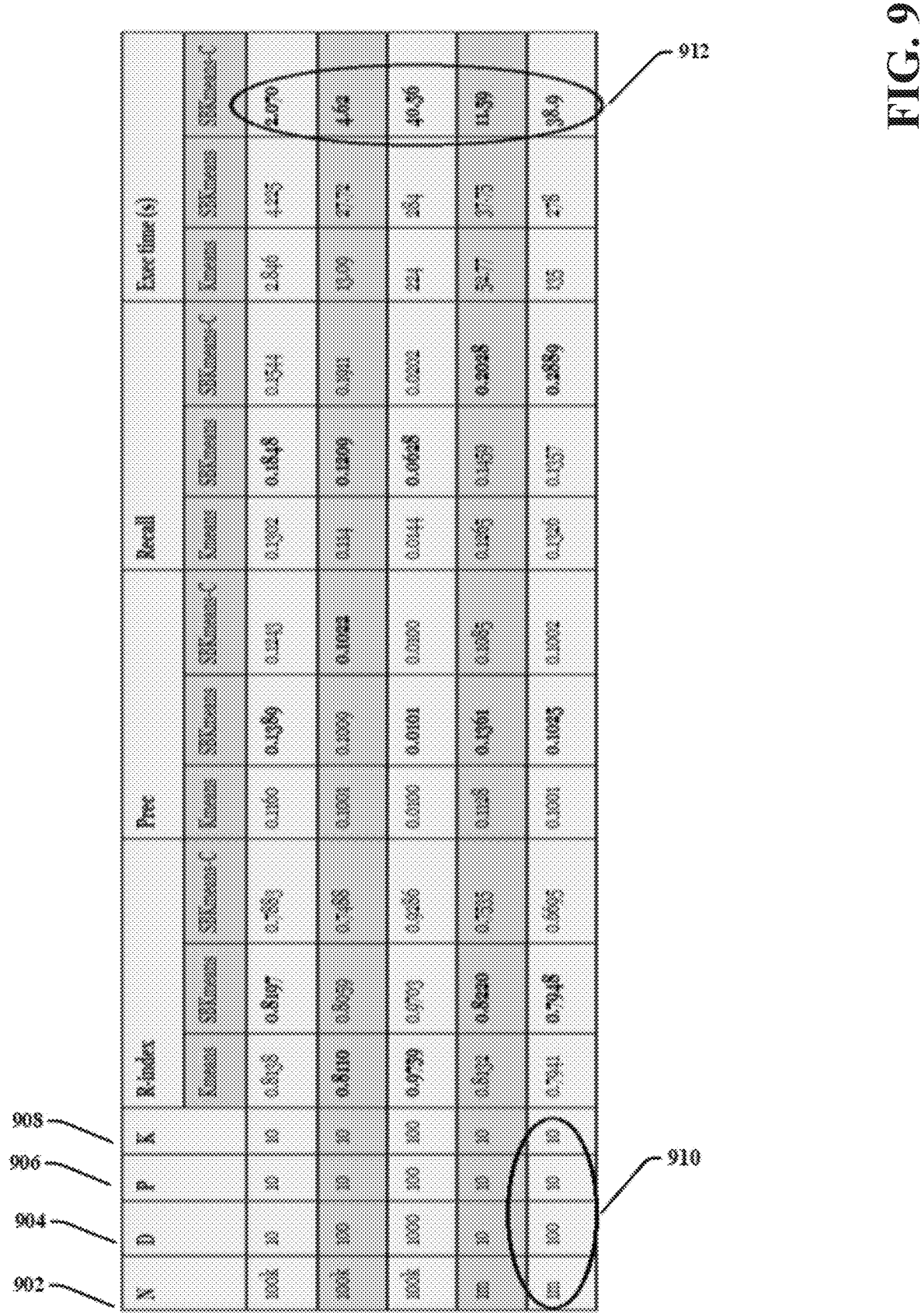
FIG. 9 illustrates empirical observations from various K-means clustering methods.

FIG. 9 illustrates an empirical observation for various K-means clustering methods. From analysis of these results, the resulting data indicates significant increased performance regarding execution time shown in block 912. Compared to K-means and SBK, these embodiments (identified as SBKmeans-C) depict execution times exponentially lower than the other methods. Note the consistent low execution times for various permutations of the N,D,P,K variables (where N represents the number of data points labelled as block 902, D represents the dimension labelled as block 904, P represents the number of components to generate the data labelled as block 906 and K represents the number of clusters used to partition the data labelled as block 908). When observing the results using a large data set such as block 910, the execution time of 38.9 s far outperforms the competing times of 135 and 278 seconds. The dataset for this task is dense as there are 1 million data points and 100 for the dimension value. The recall value for this data sample also reflects a distinct improvement up to 2 times better than the other two methods. Upon further examination, it is clear that these embodiments performance regarding the R-Index and precision that the results are of comparable values with respect to K-means and SBK means. From an overall data perspective, these embodiments can clearly provide very fast approximation without sacrificing clustering effectiveness.

Figure 10:
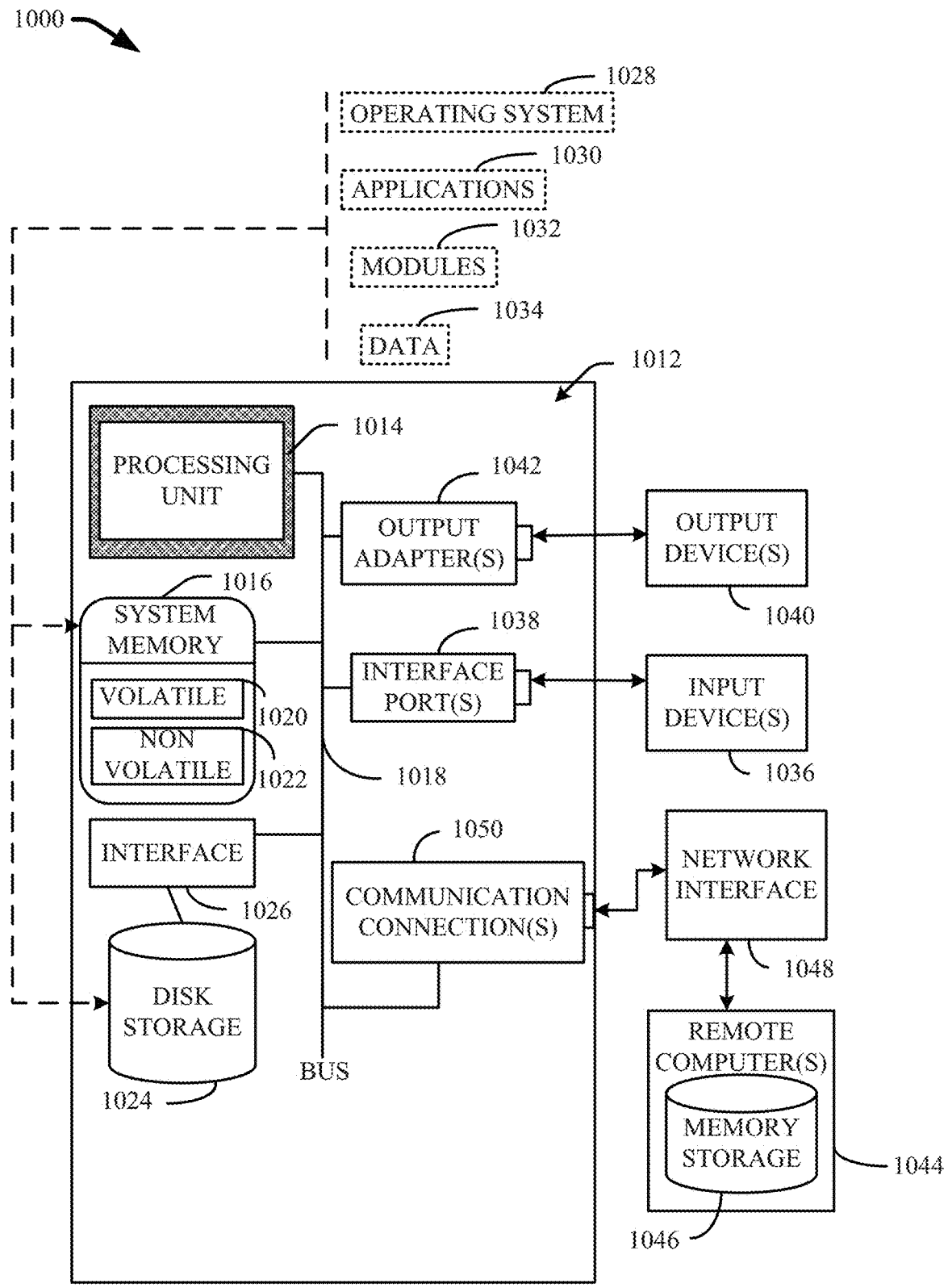
FIG. 10 illustrates a schematic diagram of an example operating environment in accordance with one or more implementations described herein.

FIG. 10 illustrates a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 11 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor-based appliance, a peer device or other common network node and the like, and typically can also include many or all the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It can be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes the computer executable components stored in the memory, the computer executable components comprising:
   an encoding component that encodes a set of real-time valued vectors as bit vectors, wherein the set of real-time valued vectors represents original data comprising unstructured patient data at a hospital; and
   a clustering component that performs K-means clustering on the bit vectors to structure the original data, via a modified K-means algorithm that accesses the bit vectors such that approximated values of signatures of centroids are computed during K-means iterations from the bit vectors without accessing the original data.

2. The system of claim 1, further comprising an estimating component that computes the approximated values of the signatures using the bit vectors, wherein a centroid represents an average across individual data points represented by respective individual bit vectors in a cluster.

3. The system of claim 2, wherein the estimating component uses the signatures loaded into the system to further compute centroid values for new centroids during K-means iterations, such that privacy of information represented by the bit vectors is preserved.

4. The system of claim 1, wherein an estimating component stores individual real-time valued vectors as hash values of M- bytes of memory, wherein M is an integer.

5. The system of claim 2, wherein the estimating component determines distances between individual hash values by calculating Hamming distances with bitwise operations.

6. The system of claim 2, wherein the estimating component computes super-bit signatures for a first point as a first value, and wherein the estimating component stores the first value as a 64 bit integer.

7. The system of claim 6, wherein the estimating component assigns the first value to a centroid of a cluster of a plurality of clusters, by further computing Hamming distances of the first value from respective centroids of individual clusters of the plurality of clusters.

8. The system of claim 7, wherein the estimating component recomputes a centroid vector for the cluster based on assignment of the first value.

9. The system of claim 2, wherein the estimating component iterates approximations until convergence, based on a predetermined number of iterations.

10. A computer-implemented method, comprising:
encoding, by a system operatively coupled to a processor, a set of real-time valued vectors as bit vectors, wherein the set of real-time valued vectors represents original data comprising unstructured patient data at a hospital;
performing, by the system, K-means clustering on the bit vectors to structure the original data via a modified K-means algorithm that accesses the bit vectors; and
computing, by the system, approximated values of signatures of centroids during K-means iterations from the bit vectors without accessing the original data.

11. The computer-implemented method of claim 10, further comprising:
computing, by the system, the approximated values of the signatures using the bit vectors, wherein a centroid represents an average across individual data points represented by respective individual bit vectors in a cluster.

12. The computer-implemented method of claim 11, further comprising:
computing, by the system, centroid values for new centroids during K-means iterations, by using the signatures loaded into the system, such that privacy of information represented by the bit vectors is preserved.

13. The computer-implemented method of claim 10, further comprising:
storing, by the system, real-time valued vectors as respective hash values of M-bytes of memory, wherein M is an integer.

14. The computer-implemented method of claim 13, further comprising:
determining, by the system, distances between individual hash values by calculating Hamming distances with bitwise operations.

15. The computer-implemented method of claim 11, further comprising:
computing, by the system, super-bit signatures for a first point as a first value, wherein an estimating component stores the first value as a 64 bit integer.

16. The computer-implemented method of claim 15, further comprising:
assigning, by the system, the first value to a centroid of a cluster of a plurality of clusters, by further computing Hamming distances of the first value from respective centroids of individual clusters of the plurality of clusters.

17. The computer-implemented method of claim 16, further comprising:
recomputing, by the system, a centroid vector for the cluster based on assignment of the first value.

18. The computer-implemented method of claim 10, further comprising:
iterating, by the system, approximations until convergence based on a predetermined number of iterations.

19. A computer program product, comprising a computer readable storage medium having program instructions embodied therewith, the program instructions executable by a processor to cause the processor to:
encode, by the processor, a set of real-time valued vectors as bit vectors, wherein the set of real-time valued vectors represents original data comprising unstructured patient data at a hospital;
perform, by the processor, K-means clustering on the bit vectors to structure the original data via a modified K-means algorithm that accesses the bit vectors; and
compute, by the processor, approximated values of signatures of centroids during K-means iterations from the bit vectors without accessing the original data.

20. The computer program product of claim 19, further comprising program instructions executable by the processor to cause the processor to:
compute, by the processor, the approximated values of the signatures using the bit vectors, wherein a centroid represents an average across individual data points represented by respective individual bit vectors in a cluster.

* * * * *